United States Patent [19]

Steyskal

[11] Patent Number: 4,561,217

[45] Date of Patent: Dec. 31, 1985

[54] SYSTEM FOR PRECISION CENTERING A BORE UPON A SHAFT

[75] Inventor: Rex F. Steyskal, Roseville, Mich.

[73] Assignee: Sidley Diamond Tool Company, Garden City, Mich.

[21] Appl. No.: 620,633

[22] Filed: Jun. 14, 1984

[51] Int. Cl.[4] .............................................. B24B 41/04
[52] U.S. Cl. ........................................ 51/168; 83/666; 83/676; 409/231
[58] Field of Search .................. 51/168; 409/231, 234, 409/232, 236; 403/13, 14, 259; 279/16, 1 D, 1 W; 83/666, 665, 663, 676

[56] References Cited

U.S. PATENT DOCUMENTS

| | | | |
|---|---|---|---|
| 3,119,625 | 1/1964 | Marr | 409/231 |
| 3,805,661 | 4/1974 | Tuomaala | 83/666 |
| 4,257,197 | 3/1981 | Lombard | 51/168 |

*Primary Examiner*—Roscoe V. Parker

*Attorney, Agent, or Firm*—Cullen, Sloman, Cantor, Grauer, Scott & Rutherford

[57] ABSTRACT

A system for precision centering a bored rotary member upon a mounting shaft, which relatively loosely extends through the bore, includes a radially outwardly extending shoulder on the shaft against which one end of the bored member is seated. A generally triangular shaped, plate-like insert, having a central opening, is positioned over the other end of the bore. The corner portions of the insert are immovably fastened to the member and the shaft passes through the central opening. The periphery of the opening is defined by a series of spaced apart, equal radius, arcuate segments which form substantially line contacts with the shaft periphery. The radii of the segments are centered on the bore axis and are slightly shorter in length than the shaft radius, which is shorter than the bore radius. Thus, the arcuate segments resiliently compress radially inwardly around the shaft to center the bore upon the shaft.

9 Claims, 5 Drawing Figures

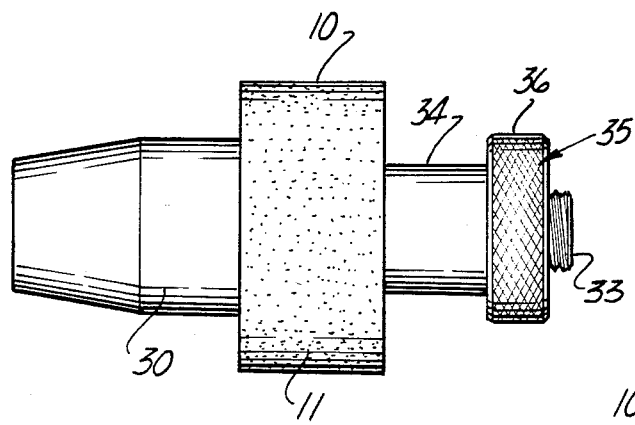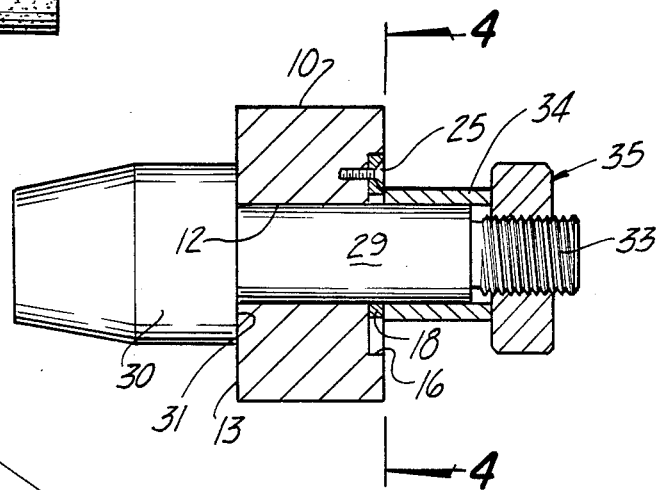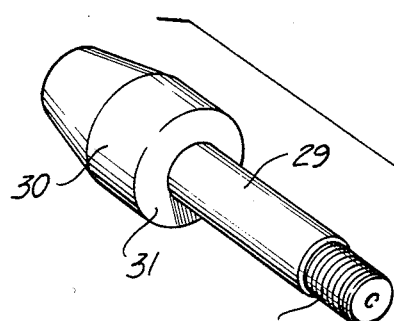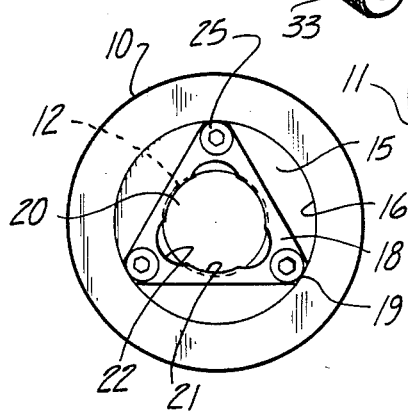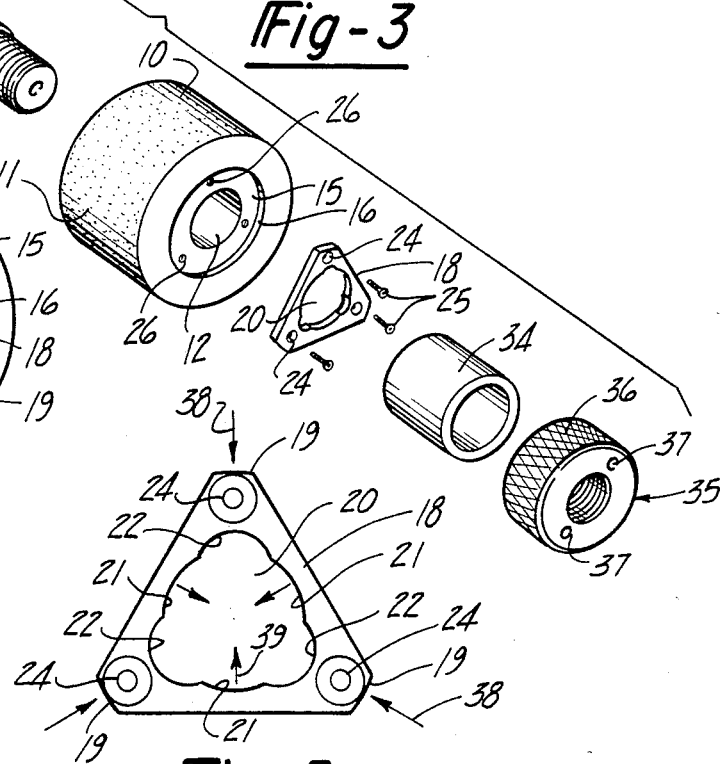

SYSTEM FOR PRECISION CENTERING A BORE UPON A SHAFT

BACKGROUND OF INVENTION

It is very difficult to precisely center a centrally bored, rotatable object upon a mounting shaft or arbor. In the case of grinding wheels, diamond dressing rolls and the like type of rotary, roughly cylindrically-shaped articles, it is necessary to precisely align the bore axis of the object with the arbor or shaft upon which it is carried. Misalignment or cocking of the article relative to the shaft, such as on the order of thousandths, or sometimes, even tenths of thousandths, of an inch, are undesirable for many industrial purposes.

To center a bore upon its mounting shaft, it was necessary to precisely machine the bore and the shaft so that they precisely interfit. This requires precision roundness of the bore and the shaft circumference, precision straightness, etc. Even then, some misalignment is inherent because there is inevitably some manufacturing tolerance required, or inaccuracies which occur during machining operations, and there must be sufficient difference in diameters of the bore and the shaft so that the shaft can be slid into the bore. Hence, the shaft must be undersized at least sufficiently for telescoping it into the bore. This, of course, creates inaccurate centering in the cases of precision centering requirements.

The term "precision" centering, may, of course, cover a wide range of inaccuracies. Thus, for the purposes of this disclosure, an example may be in the range of 0.001 inch or less and preferably in the 0.00001 inches range.

Significantly, there has been a long standing industrial need for inexpensive systems for self-centering, precision centered bores on precision shafts. The invention herein relates to an improved system for accomplishing precision centering while simultaneously eliminating the need for precision finishing of the bore itself.

SUMMARY OF INVENTION

The invention herein contemplates a self-centering, precision centered bored object whose bore may be slightly oversize relative to a precision surfaced shaft upon which the bore is to be mounted. One face of the bored object is provided with a circular, depressed socket which is coaxial with the bore axis. A triangular-shaped, flat, plate-like insert, which is formed of a material having a limited inherent resiliency, is force fitted into the depressed socket so that its corners engage the wall of the socket and are somewhat resiliently compressed or are under radially inward pressure because of the force fit.

The insert is provided with a central opening which overlies and is aligned with the bore and is precisely coaxial therewith. The opening is formed of a series of separated arcuate segments which are spaced apart by notches. These notches are aligned with the corners of the insert and the arcuate segments are aligned with the side walls of the insert. The radii of the arcuate segments, are all centered on the center of the bore and are equal in length, but are slightly smaller or shorter than the radius of the shaft.

The shaft is forcibly inserted through the opening. Since there is a slight interference fit, the shaft causes the segments to resiliently expand a slight amount and, thereby, to center the insert, and consequently, the socketed bored article, upon the shaft.

By providing a stop or shoulder on one end of the shaft, the bored object is pushed until one end is seated against the stop. The opposite end with the insert provides the self-centering effect. Thereafter, the bored object may be mechanically fastened to the shaft so that the seating against the shaft stop and the insert cause the object to be precisely centered relative to the shaft axis. Although, the centering contemplates a minute amount of tolerance permitted for the particular part, the bore itself may be of a considerably larger tolerance, misaligned, and even out of round and out of lengthwise accuracy, to some limited extent.

As can be seen, an object of this invention is to be able to manufacture a bore which is relatively inaccurate, but to provide a means for precision centering the bore upon a precision made shaft as if the bore were, indeed, precisely formed as to roundness, diameter, straightness, etc.

A further object of this invention is to provide a means for self-centering a bored object upon a support shaft or arbor, wherein only the shaft may be precision made, utilizing an aligning device which centers the bore even though the bore itself is not precisely accurate.

These and other objects and advantages of this invention will become apparent upon reading the following description, of which the attached drawings form a part.

DESCRIPTION OF DRAWINGS

FIG. 1 is an elevational view of a diamond roll dresser mounted upon a supporting shaft or arbor.

FIG. 2 is a view similar to FIG. 1, but showing parts in cross-section.

FIG. 3 is a perspective view of the disassembled parts making up the bored roll and arbor assembly.

FIG. 4 is an end view, taken as if in the direction of arrows 4—4 FIG. 2, showing the insert mounted within the socketed end of the rotary member.

FIG. 5 is an elevational view of the insert, per se, with arrows illustrating the forces relating to the insert.

DETAILED DESCRIPTION

FIGS. 1 and 2 schematically illustrate a rotary member 10, as for example, a diamond roll dresser, a grinding wheel, or other generally cylincrically shaped object which is to be mounted upon a shaft or arbor. The rotary member may be cylindrical in configuration or may have a configured surface, such as grooves, gear-forming teeth, flanges, etc. For purposes of this disclosure, the rotary member is schematically shown in the form of a cylindrical shaped wheel-like roll having an abrasive surface 11. For example, the surface may be diamond coated for dressing grinding wheels or the like.

The rotary member is provided with a central bore 12 which opens through the member at one end which forms a stop face 13 that is squared or arranged perpendicular, to the axis of the bore.

The opposite face of the member is provided with a circular depressed socket 15 which is defined by a circular or cylindrical socket wall 16. That wall is formed coaxial with the bore axis.

A roughly triangular shaped insert 18 is fitted within the socket. This insert is a flat, plate-like triangle whose corners are formed as rounded portions 19 for good contact with the socket wall 16. Preferably the insert is made of a metal material which is inherently somewhat resilient, such as a suitable steel material. The choice of material may be made by those skilled in the art from commercially available material depending upon the purpose of which the rotary member is to be adapted. Thus, the particular material is not pertinent other than that it should be sturdy, able to maintain precision dimensions and have some limited inherent resiliency.

The insert is provided with a central opening 20 which overlaps and is axially aligned with the bore. The opening itself, although formed as if completely circular, is made of arcuate segments 21 which are interrupted by deeper arcuate notches or cut-outs 22. These notches are located in the corner portions of the triangular insert, whereas the arcuate segments 21 are located adjacent the walls of the triangle, so that they are approximately parallel to and closely adjacent the triangular walls.

The insert may also be provided with screw holes 24, through which fastener screws 25 are inserted for interlocking with threaded screw holes 26 formed in the rotary member in the base of the socket.

The shaft or arbor or stud 29, which is schematically illustrated, is precision made. That is, it is made to the required concentricity, straightness, diameter accuracy, etc. It is provided with an enlarged head portion 30 which provides a radial shoulder or stop 31 arranged perpendicular to the axis of the shaft. The shaft free end may be threaded at 33, as will be explained.

If the rotary member 10 is mounted upon the shaft in the manner shown in FIG. 2, a cylindrically shaped spacer sleeve 34 may be loosely positioned around the free end of the shaft. Then, a nut 35 engages the threaded end 33 for pressing the spacer sleeve 34 against the end of the rotary member, which in turn forces the stop face 13 of the rotary member against the shoulder or stop 31 of the shaft.

In order to tighten and loosen the nut, it may be knurled, such as schematically shown at 36, and may also be provided with wrench holes 37 of any standard type. The particular configuration of the nut, may be varied.

Significantly, when the parts are to be assembled, the rotary member is pushed upon the shaft. Since the bore is relatively loose, or oversize, relative to the shaft, the rotary member easily moves along the shaft until the insert segments engage the shaft's surface. The insert segments are preferably of a smaller diameter or radii than the shaft so that there is an interference fit. A one-half thousandths interference fit, that is, with the radii of the segments being one-half thousandths less than the radius of the shaft, is an example of such an interference fit.

Once the insert segments form their line contact with the peripheral surface of the shaft, considerable manual force may be required to move the rotary member until it seats against the shaft shoulder. At that point, the spacer sleeve and the nut can be applied to tighten the parts together.

The radial shoulder 31 and the seated stop face 13 of the rotary member cooperate to align or center the rotary member as part of the centering action that takes place due to the insert. Thus, the precision centering is achieved and maintained with this assembly. The assembly itself, can then be mounted in an appropriate drive mechanism for rotating it, as in the case of a grinding wheel or roll or the like.

As illustrated by the arrows 38 in FIG. 5, because the triangular insert is larger than the socket, that is, it is fitted within an inscribed, imaginary circle which is slightly larger than the circle of the socket wall, the insert is force fitted and maintained under radially inwardly directed pressure which tends to resiliently compress the insert radially inwardly. Likewise, the segments exert a radially inwardly directed force that squeezes the shaft as indicated by the arrows 39.

This construction is relatively easy to assemble and disassemble, in addition to being simpler to manufacture because of the elimination of the need to make the bore precise. In addition, the amount of pressure needed to assemble the parts is manageable, assuming proper interference fits are selected. This avoids hammering and damage which may have been caused in the past in trying to interfit parts which were vitually identical in size.

Having fully described an operative embodiment of this invention, I now claim:

1. A system for precision centering the bore of a rotary member upon a mounting shaft, comprising:

a precision circular circumference mounting shaft having a free end and a radially outwardly extending shoulder on the shaft at a predetermined distance from the free end;

a rotary member having a bore extended therethrough for relatively loosely receiving the shaft, and having a stop face at one end for engaging the shaft shoulder; the opposite face of the rotary member being provided with a circular, depressed socket defined by a cylindrically shaped socket wall that is coaxial with the bore;

a generally triangular shaped, flat, plate-like insert positioned within the socket with its corner portion engaging the socket wall, and with the insert being slightly over-size relative to the socket wall periphery so that it is under a radially inwardly compressive force from the socket wall;

a central opening formed in the insert and overlying the bore, in coaxial alignment therewith;

said opening being defined by endwise separated, arcuate segments, whose radii are centered on the bore center and are slightly shorter than the shaft radius, which in turn is slightly shorter than the bore radius;

means holding the rotary member stop face against the shaft shoulder;

whereby the insert arcuate segments are in substantially linear engagement with, and resiliently compress inwardly against, the peripheral surface of the shaft for precisely centering the bore upon the shaft.

2. A system as defined in claim 1, and wherein the spaces between the arcuate segments are formed by relatively short, arcuate cut-out portions located at each of the corner portions of the insert, for positioning each of the arcuate segments in substantial close, roughly parallel, alignment with a side of the triangular insert.

3. A system as defined in claim 2, and including mechanical fasteners securing the insert, at its corner portions, to the rotary member.

4. A self-centering precision bored rotary member for slidably receiving and mounting upon a precision support shaft having a stop for engaging against an end of the member, comprising:

the face of the rotary member that is opposite to the stop engaging face being provided with a circular, depressed socket which is defined by a circular, socket wall that is coaxial with the bore;

a generally triangular shaped, flat, plate-like insert snugly fitted within the socket, with its corner portions engaging the socket wall and being squeezed radially inwardly by the snug contact with the socket wall;

a central opening formed in the insert, with the opening being coaxial with, and overlying the bore;

the edge defining the opening being formed of three, equal radius arcuate segments whose radii are centered on the bore radius; with the segment radii being slightly shorter than the shaft radius;

the adjacent ends of the segments being spaced apart by cut-out notches aligned with the insert corner portions, so that the segments are closely adjacent the insert wall forming portions;

whereby the segments grip and radially inwardly compress against the shaft peripheral surface for precisely centering the bore upon the shaft.

5. A device as defined in claim 4, and including screw-like mechanical fasteners securing the corner portions of the insert to the rotary member.

6. A method for precision centering a bore, formed in a wheel-like rotatable member having opposed faces at which the bore opens, upon a precision circumference mounting shaft which has a radially outwardly extending shoulder formed thereon and which extends through the bore, comprising:

immovably positioning a flat, plate-like insert, having a central opening, upon one of the faces of the member with the opening being formed of equal radius, arcuate edges that are spaced apart along the arc of a circle whose diameter is slighly less than the shaft diameter;

forcing the shaft into and through the insert opening until a face of the member securely engages said shoulder, for resiliently, radially outwardly expanding the arcuate edge defining portion of the opening;

and thereafter, releasbly locking the member against removal from the shaft, whereby the bore is precision arranged coaxial with the shaft axis.

7. A method as defined in claim 6, and including forming a circular depressed socket in one face of the bored member;

and forming the insert in an approximately triangular shape, which is slightly larger than the diameter of the circular edge defining the socket;

and forcing the insert into the socket so that its corner portions tightly engage against the socket edge and the insert is placed under an inwardly directed compressive force.

8. A method as defined in claim 7, and including forming a notch in the insert between the ends of adjacent arcuate edges, with the notches being located in the corner forming portions of the insert.

9. A method as defined in claim 8, and including releasably mechanically fastening at least one of the corner forming portions of the insert to the respective face of the member.

* * * * *